(12) United States Patent
Martin

(10) Patent No.: US 7,315,634 B2
(45) Date of Patent: Jan. 1, 2008

(54) METHOD FOR COMPARING FINGERPRINTS

(75) Inventor: Lionel Martin, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 708 days.

(21) Appl. No.: 10/234,754

(22) Filed: Sep. 4, 2002

(65) Prior Publication Data
US 2003/0044052 A1 Mar. 6, 2003

(30) Foreign Application Priority Data
Sep. 4, 2001 (FR) .................................. 01 11434

(51) Int. Cl.
*G06K 9/00* (2006.01)
(52) U.S. Cl. ........................................ 382/125; 382/124
(58) Field of Classification Search ................ 382/125, 382/124
See application file for complete search history.

(56) References Cited

U.S. PATENT DOCUMENTS 5,631,972 A * 5/1997 Ferris et al. ................ 382/125

6,134,340 A * 10/2000 Hsu et al. ................... 382/124

OTHER PUBLICATIONS

French Search Report from French Patent Application No. 01/11434, filed Sep. 4, 2001.
Jain A. K., et al.: "An Identity-Authentication System Using Fingerprints" Proceedings of the IEEE, IEEE. New York, US, vol. 85, No. 9, Sep. 1, 1997, pp. 1365-1388.
"Exclusive Use Equipment" NEC Research and Development, Nippon Electric Ltd., Tokyo, JP, No. 96, Mar. 1, 1990, pp. 143-159.

* cited by examiner

*Primary Examiner*—Bhavesh M Mehta
*Assistant Examiner*—Jonathan Schaffer
(74) *Attorney, Agent, or Firm*—Lisa K. Jorgenson; James H. Morris; Wolf, Greenfield & Sacks, P.C.

(57) ABSTRACT

A method and a system for comparing a set of minutiae of a current image with a set of minutiae of a reference image, according to which the minutiae are sorted by their Cartesian coordinates in the image plane from a predetermined point of origin, a common path of similar minutiae is searched in the reference set and in the current set, and it is considered that there is an identity between the two images if the common path is comprised of a number of segments greater than a first threshold.

9 Claims, 4 Drawing Sheets

METHOD FOR COMPARING FINGERPRINTS

BACKGROUND OF THE INVENTION

1. Field of the Invention

The present invention relates to the recognition of fingerprints, which is a well know biometric technique for the identification of individuals. The present invention more specifically relates to an automatic identity authentication method and system by recognition of fingerprints based on a comparison of a current fingerprint with one or several previously stored reference fingerprints.

2. Discussion of the Related Art

In the past, fingerprint recognition would essentially be used as a proof and identification element in criminal cases. Now, fingerprints are also used as a means of identification and authentication of an individual in access control or in secure authentication systems.

The fingerprint recognition is performed by examining the papillary line arrangement which forms characteristic points called minutiae. At least 8 (generally, between 8 and 17) of such minutiae of the papillary arrangement with no mismatching between two prints are necessary for the prints to be considered as being identical.

13 different types of minutiae have been counted. The 6 most frequent minutiae are the end, the independent groove, the branch, the spur, the lake, and the crossing. From a statistical point of view, minutiae of branch and end type are a majority in a fingerprint. Therefore, in automated fingerprint recognition processes, the matching of the minutiae of branch and end type is essentially examined.

FIG. 1 very schematically shows an automatic fingerprint recognition system of the type to which the present invention applies. Such a system is essentially formed of a sensor 1 (formed, for example, of an optical device of digitizer type) connected to a processing unit 2 (PU) in charge of interpreting the measurement results. Unit 2 provides, over a connection 3, a signal of authentication or non-authentication of a finger D laid on sensor 1. Processing unit 2 generally has the function of shaping the graphical image generated by sensor 1 and of analyzing this image to compare it with one or several images contained in a reference database.

FIG. 2 illustrates, in the form of blocks, a conventional example of a fingerprint recognition method of the type to which the present invention applies. Sensor 1 provides a graphical image 10 in which the grooves s (peaks and valleys) of the papillary arrangement are shown in shades of grey. Processing unit 2 then performs a digital preprocessing of the image (most often a filtering and a binarization followed by a thinning down or a squeletization of the grooves) to obtain a view (block 11) exploitable for the minutia extraction. In a next step (block 12), the position of the minutiae in the image is determined. In FIG. 2, the minutiae are symbolized by triangles b when they are branches and by crosses t when they are ends. The actual recognition is performed based on a mapping 13 of the minutiae, which are compared (block 14, MATCH) with one or several reference mappings 15 contained in a database (DB). Result R of the comparison is provided to the application having required the fingerprint authentication.

The present invention more specifically relates to the comparison (block 14, MATCH) of a current minutia mapping with a reference minutia mapping. The obtaining of this mapping and the minutia extraction is performed by any known method. Among these known methods, the method described in article "Minutia Matching Algorithm in Fingerprint Verification" by X. Luo, J. Tian, and Y. Wu, published in 2000 in Proceedings of the International Conference on Pattern Recognition and incorporated herein by reference may be mentioned as an example.

A first known method to compare a current minutia mapping with a reference mapping consists of selecting a point of the current mapping, then transforming the mapping into polar coordinates so that the selected point becomes the center of the image. A point of the reference set is then selected and this set is also transformed into polar coordinates. All modules and angles of the different points (minutiae in both spaces) are then compared to determine possible matchings.

A first disadvantage of this method is that all the minutiae of the reference set must be selected by being successively taken as an origin to compare the mapping with that of the current set. This requires a great number of comparisons.

A second disadvantage is that the point selected as the origin in the current image may, instead of being a minutia, be an artifact of the image. The previously-mentioned great number of comparisons must thus be performed by successively taking all the points of the current set as the origin of the polar coordinates to be sure that there is no matching between the two fingerprints.

The above first method enables interrupting the algorithmic processing as soon as a matching of a sufficient number of minutiae has been found. However, it must be carried on with all minutiae to be sure that there is no matching. The required time is then relatively long (on the order of one second).

A second known method consists of applying a so-called generalized Hough transform to examine the power required to pass from one minutia mapping to the other. Such a method is described, for example, in article "A real-time matching system for large fingerprint databases" by A. K. Jain, S. Shaoyun, K. Karu, and N. K. Ratha, published in IEEE Transactions on pattern analysis and machine intelligence, August 1996 (Vol. 18, N° 8) which is incorporated herein by reference. The implementation of such a method requires a lot of calculations and takes even more time (several seconds) than the former.

SUMMARY OF THE INVENTION

The present invention aims at providing a novel fingerprint recognition method by comparison of minutia mappings which enables identifying, faster than with conventional methods, the matching or not of two fingerprints.

The present invention also aims at reducing or minimizing the resources used to execute the algorithm.

The present invention also aims at reducing or minimizing the size of the program necessary to implement the algorithm.

The present invention also aims at limiting the number of memory accesses necessary upon execution of the algorithm.

The above objects especially aim at enabling, in a preferred application of the present invention, its implementation in a smart card.

The present invention further aims at providing an automatic fingerprint recognition system and method implementing the same type of algorithms, be it to store a reference fingerprint or to identify a current fingerprint with respect to this reference fingerprint.

To achieve these and other objects, the present invention provides a method for comparing a set of minutiae of a current image with a set of minutiae of a reference image, including the steps of:

arranging the minutiae in the order of their Cartesian coordinates in the image plane from a predetermined point of origin;

searching, in the reference set and in the current set, a common path of similar minutiae; and considering that there is an identity between the two images if the common path is comprised of a number of segments greater than a first threshold.

According to an embodiment of the present invention, the search for the common path is performed, segment by segment, by increasing coordinates of the minutiae defining the segments.

According to an embodiment of the present invention, when the search for a new segment of a common path is unsuccessful, the search is resumed from the preceding segment, taking no account of the minutia having led to an unsuccessful search.

According to an embodiment of the present invention, the number of times when the search is resumed from a preceding segment is compared with a regression threshold beyond which it is considered that there is no identity between the current and reference images.

According to an embodiment of the present invention, the regression threshold is a function of the numbers of minutiae in the current and reference sets.

According to an embodiment of the present invention, the method further includes the steps of:

selecting, in the current set and in the reference set, a first pair of minutiae starting from the Cartesian origin of the respective referentials of the two images;

comparing if the calculated segments are identical at the same time in orientation, in length, and in type of involved minutiae; and if so, taking this first pair of minutiae as the starting point of a path and if not, proceeding to next pairs of minutiae.

According to an embodiment of the present invention, to determine a first segment, a second threshold of examined minutiae beyond which it is considered that there is no identity between the current and reference images is set.

According to an embodiment of the present invention, the orientation and length identity between two segments takes predetermined tolerances in the Cartesian coordinates into account.

According to an embodiment of the present invention, the tolerance is, in orientation, more or less approximately 10 degrees, preferably, more or less approximately 5 degrees.

According to an embodiment of the present invention, the tolerance is, in translation, at most more or less approximately one third of the image size in the direction corresponding to the finger length, and at most more or less approximately one quarter of the image size in the direction corresponding to the finger width.

According to an embodiment of the present invention, the respecting of the tolerances is ensured by the configuration of a fingerprint sensor.

According to an embodiment of the present invention, the first threshold is a function of the numbers of minutiae in the current and reference sets.

The present invention also provides a fingerprint recognition system of the type including a sensor and a processing unit, the sensor being configured to set a tolerance for the positioning of a finger both in rotation and in translation with respect to the sensor plane.

According to an embodiment of the present invention, the sensor configuration is obtained by lateral and longitudinal stops in the finger positioning.

The foregoing objects, features and advantages of the present invention, will be discussed in detail in the following non-limiting description of specific embodiments in connection with the accompanying drawings.

DETAILED DESCRIPTION

Figure 1:
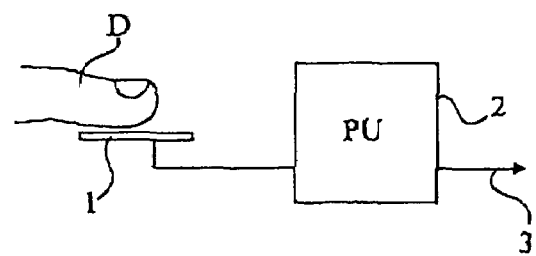
FIG. 1, previously described, very schematically shows an automatic fingerprint recognition system of the type to which the present invention applies.
Figure 2:
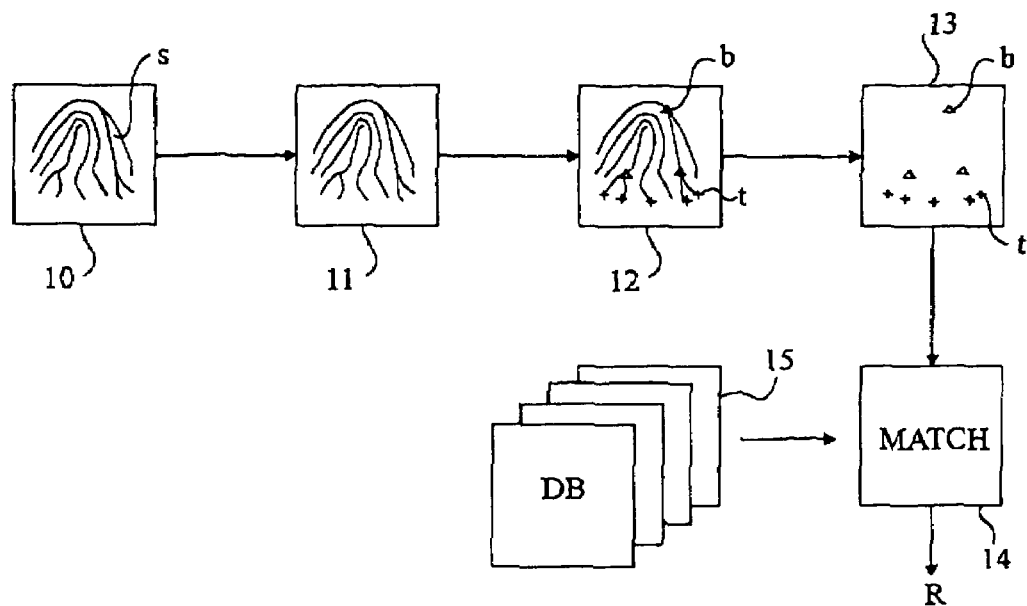
FIG. 2, previously described, shows the conventional steps of a fingerprint recognition method of the type to which the present invention applies.

The same elements have been designated with the same references in the different drawings. For clarity, only those method steps and those system components which are necessary to the understanding of the present invention have been shown in the drawings and will be described hereafter. In particular, the methods and systems necessary to obtain minutia mappings have not been described in detail since any conventional system may be used.

Figure 3B:
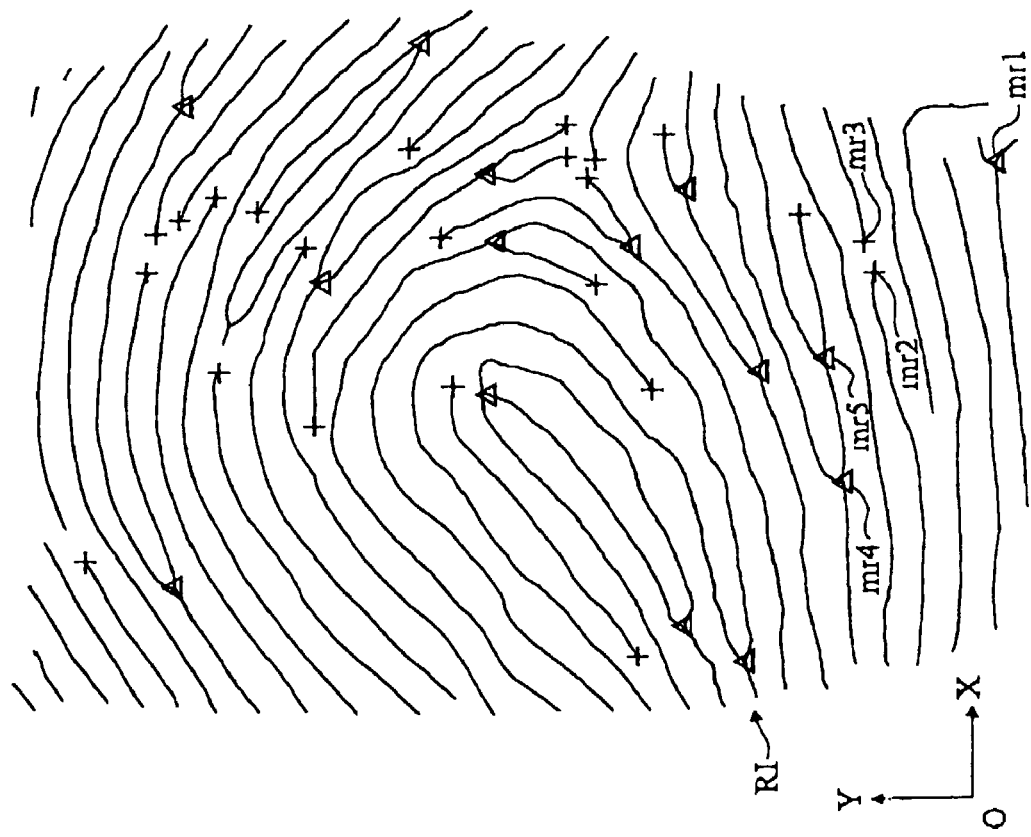
FIGS. 3A and 3B are views of papillary arrangements to be compared.
Figure 3A:
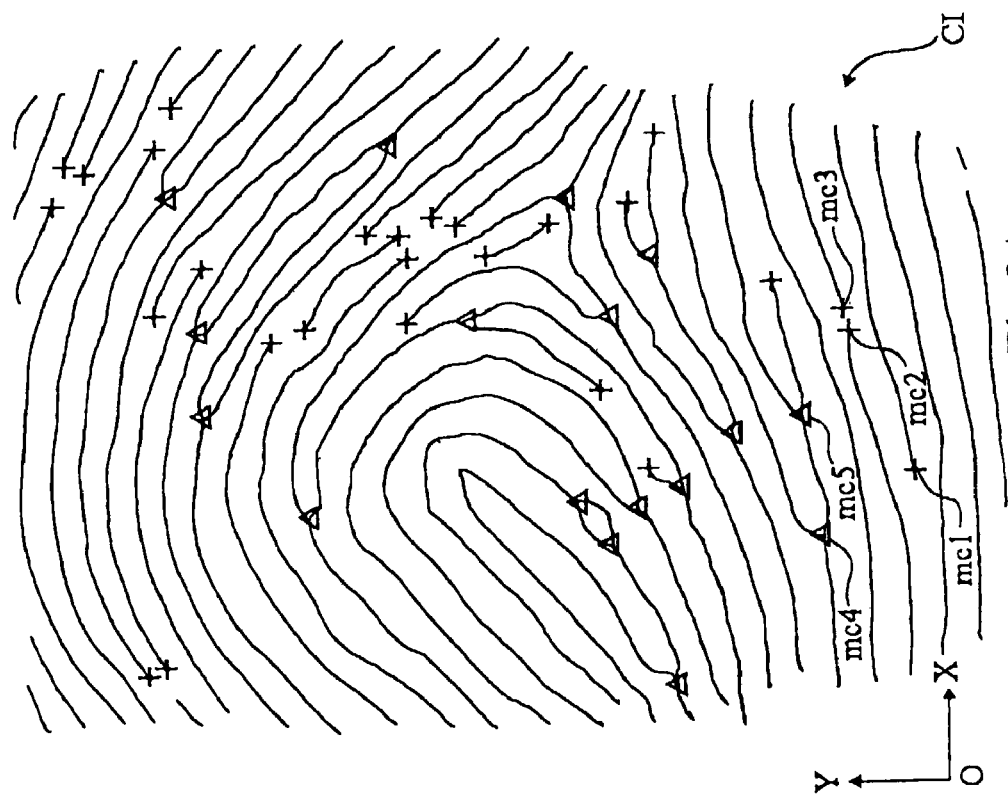

FIGS. 3A and 3B show two papillary arrangements on which the minutiae extracted by a conventional automatic method have been shown. For example, FIG. 3A shows a current image CI which is desired to be compared with a reference image RI shown in FIG. 3B. In FIGS. 3A and 3B, the minutiae have been symbolized by triangles when they are branches and by crosses when they are ends. Observing these drawings shows mismatchings between the minutiae obtained from the papillary arrangement images while the fingerprints are, in this example, identical. These differences, which must not lead to consider the fingerprints as being different may, result from pressure differences of the finger on the sensor or other artifacts.

Figure 4:
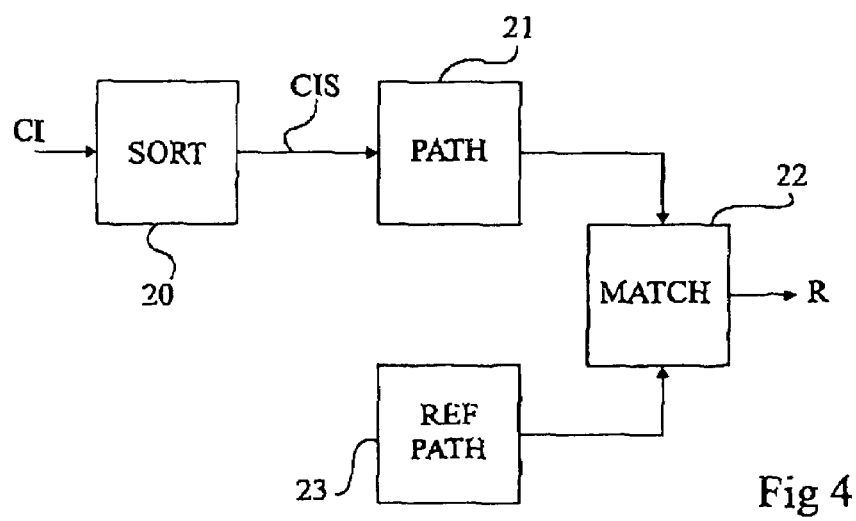
FIG. 4 very schematically illustrates, in the form of block diagrams, an embodiment of the fingerprint recognition method according to the present invention.

FIG. 4 shows, in the form of blocks, the essential steps of an implementation mode of the minutia mapping comparison method according to the present invention.

A feature of the present invention is to start (block 20, SORT) with sorting the minutiae extracted from an image representing a papillary arrangement. For each minutia of current image CI, at least the cartesian coordinates (X, Y) in the image and the type (branch or end) of the concerned minutia are stored in a table or the like. These characteristic data concern the minimum data necessary to implement the present invention. Preferably and as will be seen hereafter, the comparison will be refined by taking into account an angular characteristic of the minutiae. Accordingly, for each minutia, the angle of the groove (of the main direction of the groove) including the minutia with respect to one of the axes (generally, horizontal axis X) and/or another angular datum of the minutia are also stored in the above-mentioned table. In the case of a branch-type minutia, the angle of the groove segment which is most distant from the two others is stored. For simplification, reference will be made hereafter to the angle of a minutia to designate this angular datum, which actually corresponds to the angle between a groove or groove segment having the minutia as an end, and an axis of the referential. Other characteristics of the minutiae may be stored for other possible needs.

The classifying of set CI includes sorting the minutiae by increasing abscissas and ordinates from an arbitrary origin, which is however fixed and predetermined. A sorted set CIS is then obtained. For example, the origin of the cartesian coordinates is the lower left corner of the image. By applying this example to FIG. 3A in which n minutiae of branch or end type have been located, the first minutia mc1 of the current image is an end, as well as second and third minutiae mc2 and mc3. Fourth minutia mc4 is a branch, as well as fifth minutia mc5, and so on until the last minutia men, which is an end.

The reference set is classified in the same way (with the same origin and the same direction) as the current set with which it must be compared. According to a first embodiment where the digital images are stored in the database, the classification is performed just before the comparison with the current set. According to a preferred embodiment, the reference images undergo the sorting processing as they are stored, so that only one table of the reference minutiae, including their Cartesian coordinates, their angles (in the sense of the present invention) and their types, is stored.

For reference image RI of FIG. 3B in which m minutiae of branch or end type have been located, first minutia mr1 is a branch. Second and third minutiae mr2 and mr3 are ends, fourth and fifth minutiae mr4 and mr5 are branches, and so on until the last minutia mrm, which is an end.

Another feature of the present invention is that the comparison of the current set of sorted minutiae CIS with a reference set is performed by comparing paths between the minutiae in the current and reference sets. In other words, the preparatory sorting performed according to the present invention is used to compare the minutiae, pair by pair (thus defining segments) and the succession of these segments, from one minutia set to the other.

According to the present invention, oriented paths, that is, in the image direction which corresponds to the increasing abscissas and ordinates, are searched. Each oriented path is actually formed of a series of vectors or segments connecting the minutiae two by two. Each path is characterized by the set of (sharp) angles formed by two adjacent segments and by the segment lengths.

In FIG. 4, the determination of a path symbolized by a block 21 for the current set and the comparison (block 22, MATCH) of this current path with a reference path (block 23, REF PATH) have been symbolized. It should however be noted that, according to the present invention, the comparison is performed segment by segment as will be explained hereafter in relation with FIG. 5.

Comparing paths considerably reduces the number of calculations to be performed. The counterpart is the need for a sorting (increasing or decreasing) of the minutiae according to their coordinates.

According to the present invention, the implementation of the comparison method requires for the images to be compared to be substantially in the same referential. In other words, the sensor of a fingerprint collection system for implementing the recognition method according to the present invention includes finger positioning means (for example, a guide provided with a stop) ensuring that the user's finger is placed in the same position from one collection to the other. The tolerance admitted in the positioning depends, as will be seen hereafter, on the admitted tolerance for the matching difference between two minutiae defining a segment in the current set and in the reference set.

According to a preferred embodiment, the orientation tolerance of the image is approximately ±10 degrees and preferentially is approximately ±5 degrees. The translational tolerance is at most more or less approximately ⅓ of the image size along the finger length and more or less approximately ¼ of the image across the finger width. For example, for an image of 256*360 pixels where the 256 pixels correspond to the finger width, the translational tolerance is approximately ±120 pixels lengthwise and approximately ±65 pixels widthwise.

Figure 5:
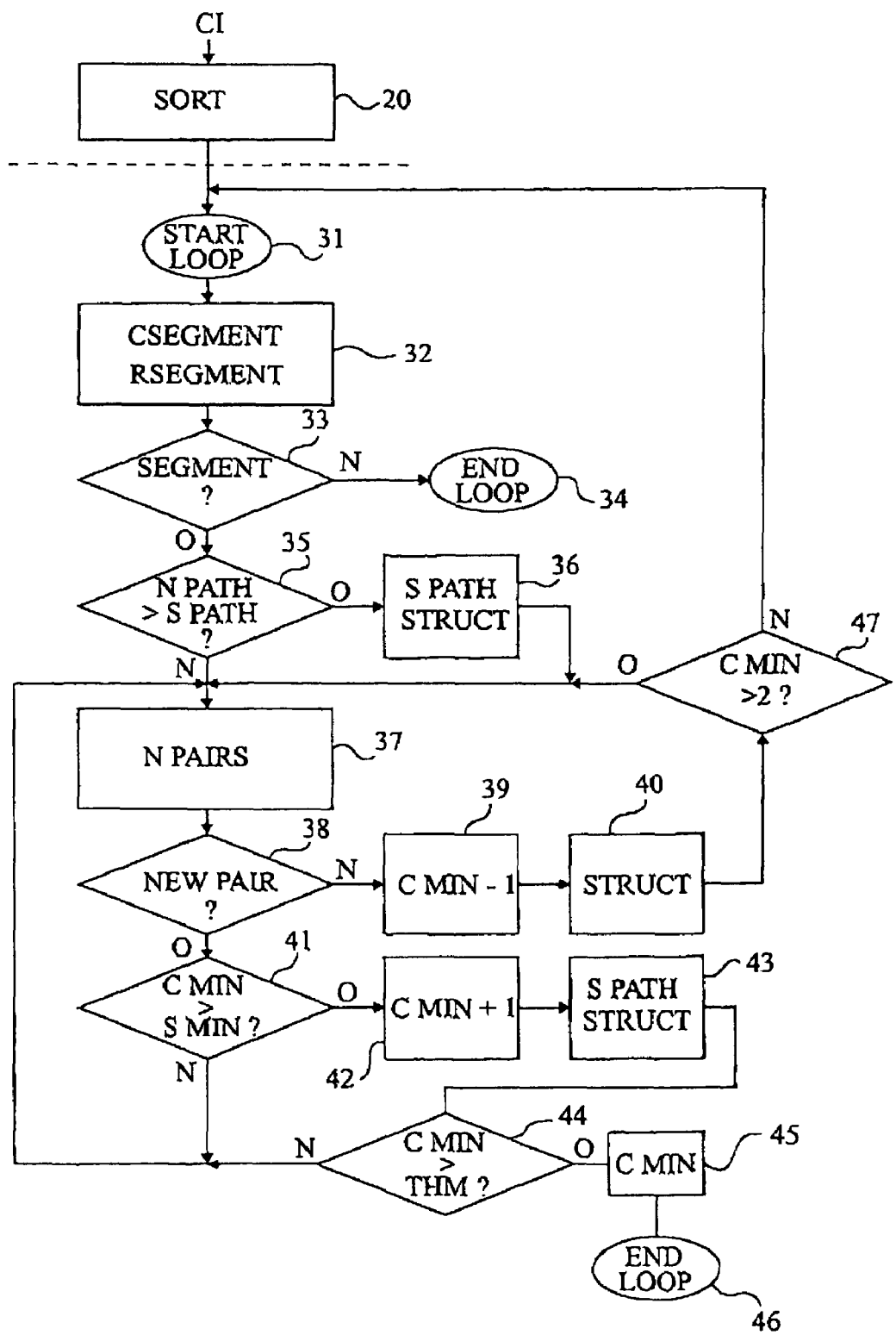
FIG. 5 is a more detailed flowchart of an embodiment of the minutia mapping comparison method according to the present invention.

FIG. 5 shows with more detail a mode of implementation of the recognition method according to the present invention. The flowchart of FIG. 5 takes as an example the processing of a current image CI which is sorted (block 20, SORT) with increasing abscissas and ordinates from an origin such as indicated in FIGS. 3A and 3B. The reference image is assumed to have previously been similarly sorted.

At the beginning (block 31) of the comparison loop (START LOOP), different counters and variables which will appear from the following description are initialized. In particular, the present invention requires storing at least the characteristics (at least the coordinates and the type) of the minutiae of the current and reference sets, and the characteristics (number and sorting number of the minutiae in the current and reference sets) of an ongoing path.

In a first step 32 (Csegment, Rsegment), a first segment of two minutiae corresponding at least to the type and distance constraints is searched in the two sets. Reference will be made hereafter to segments or pairs of minutiae, which is the same, each segment being defined by two end minutiae. The search for the segments of block 32 is performed from the cartesian origin of the minutiae. Preferably, the angle of the minutiae (respective angles between the concerned minutiae and the horizontal axis) or another orientation characteristic (for example, the main orientation of the grooves in image blocks) are also taken into account. Knowing the "orientation" of the minutiae with respect to the referential simplifies the comparison process. In particular, this enables avoiding a difficulty which is that the origins of the referentials of the two images are not necessarily identical.

Exiting from block 32, it is checked (block 33, SEGMENT?) whether a common segment (same orientation and same length) has been found. If not, the comparison loop is negatively ended (block 34, END LOOP). The result is that the prints are different.

It can thus be seen that the present invention enables acknowledging that the prints are not identical without requiring examination of all the minutiae with respect to one another. The examination of the oriented paths enables, according to a preferred embodiment, determining a threshold THL (preferably, relative to the total number of minutiae in the image or to a weighted sum of the numbers of minutiae of the current and reference images) of the number of examined minutiae to determine the first common segment, beyond which it is known that no sufficiently long common path, and thus no identity between the fingerprints, will be found. Threshold THL defines a negative end (no matching of the fingerprints) of the comparison process of the present invention.

If a common segment has been found, it is considered that an identical path has been started in the two images. Optionally, it is then tested (block 35, NPATH>SPATH?) whether the new path really is, by its coordinates, beyond a possible path previously stored in a former loop. If such is the case (or if test 35 is omitted), the stored path is updated (block 36, SPATH, STRUCT) and it is considered as being the maximum path.

Once this updating has been performed, it is returned to the same point as if test 35 was negative. This amounts to searching a new pair of minutiae corresponding to the type and distance constraints in the two sets. This step is illustrated by block 37 (NPAIRS). The search for a new pair is substantially identical to the search for the segments of block 32, but in a simplified manner, the first minutia of the new searched segment corresponding to the last stored minutia of the current path.

At the output of block 37, it is checked (block 38, NEW PAIR?) whether a common segment has been found.

If not, the number of matched minutiae in the current image is decremented (block 39, CMIN−1) and the stored structures of the matched pairs is updated (block 40, STRUCT). This updating aims at enabling a possible regression in the current path by going back to the preceding pair of minutiae. Exiting block 40, it is checked (block 47, CMIN>2?) whether the current path a priori enables determining an identity between the images.

If test 47 is positive, the search for new pairs of minutiae is resumed in the same path (block 37), but starting from the preceding segment. The return or regression provided by the present invention in the current path enables avoiding eliminating a path due to the sole fact that a retained segment directs the current path in a wrong direction (dead end). Preferably, a threshold THR of the number of regressions is set for the entire recognition algorithm. The test (not shown) is then performed after a positive result of block 47 and enables, if threshold THR is exceeded, ending the comparison (block 46, ENDLOOP). Threshold THR enables stopping the search for a common oriented path and thus defines a negative output (no matching of the fingerprints) in the sense of the present invention.

If test 47 is negative, the algorithm goes back to loop start block 31 to start a new path from a next reference minutia pair.

If test 38 provides a positive result, the number of matched minutiae CMIN is compared with the number of minutiae SMIN stored in the maximum path (block 41, CMIN>SMIN ?). If current number CMIN is greater than number SMIN, the number of matched current minutiae is incremented (block 42, CMIN+1). The path is memorized and the memorized structure of the current and maximum paths is updated (block 43, SPATH, STRUCT). The number of stored minutiae CMIN of the current path is then compared with a threshold THM (block 44, CMIN>THM ?). Threshold THM preferably corresponds to the number (for example, ranging between 8 and 17) of minutiae from which fingerprints are considered as being identical. As an alternative, threshold THM corresponds to the number of found matched minutiae, divided by a weighted sum of the total minutiae of the current and reference images. Threshold THM defines a positive output of the comparison process of the present invention. If number CMIN is smaller than or equal to threshold THM, a new pair of minutiae is searched (block 37). If number CMIN is greater than threshold THM, the total number of matched minutiae is extracted (block 45, CMIN) and the loop is ended (block 46, END LOOP). The total number of matched minutiae then defines the length of the identical paths found. A conventional process of exploitation of the authentication results is then resumed.

If number CMIN is smaller than or equal to number SMIN, this means that the new path includes less matched minutiae at this time of the comparison. The stored structure of the paths is thus not updated and the algorithm returns to step 37.

A specific example of implementation of the comparison algorithm illustrated in FIG. 5 will be described hereafter in a more detailed manner.

According to this specific example, block 32 includes the steps of:

a) selecting, in the reference set, the first free minutia (which has not been previously selected as the first minutia of a segment, as will be better understood hereafter) to define a first point of a reference segment—if there is no more free minutia in the reference set, block 32 is left without having determined any segment;

b) selecting the next free minutia (not already selected as a second minutia with the first minutia selected in a)) from the reference set to form the reference segment, then calculating distances DRefX and DRefY in abscissa and in ordinate between the two minutiae—if there is no further free minutia in the reference set, block 32 is left without having determined any segment (as an alternative, a threshold THL of remaining minutiae short of which it is not necessary to proceed is set);

c) selecting a first free minutia from the current set to define the first point of the searched segment in the current image, and comparing the type of this first minutia with that of the first minutia of the reference segment—if there is no more free minutia, the process returns to step a) to select the next minutia of the reference set;

d) if the first minutiae are not of the same type, returning to step c) to select the next minutia as the first current minutia of the searched segment, and if the first minutiae are of the same type, calculating the difference between the respective angles of these minutiae;

e) comparing this angular difference with a predetermined angular threshold, set according to the desired determination accuracy—if the angular difference is greater than the threshold, the process returns to step c) to select the next minutia, otherwise:

f) the next minutia is extracted from the current set to search for the second point of the segment of the current image, and the type of this second minutia is compared with that of the second minutia of the segment selected in the reference set—if there is no next minutia, the process returns to step c) to change the first current minutia;

g) if the second minutiae are not of the same type, the process returns to step f) to select the next minutia as the second current minutia of the searched segment, and if the second minutiae are of the same type, the angular difference between the current and reference second minutiae;

h) the angular difference is compared with the predetermined angular threshold—if the angular difference is greater than the threshold, the process returns to step t) to select the next minutia of the current image, otherwise distances DImaX and DImaY in abscissa and in ordinate between the two minutiae of the current set are calculated;

i) differences DiffDX and DiffDY between the respective distances in abscissas DRefX, DImaX and in ordinates DRefY, DImaY of the two pairs of minutiae are compared with difference thresholds in abscissas and in ordinates which can be identical—if one of differences DiffDX and DiffDY is greater than the corresponding threshold, the process returns to step f) to select the next minutia, and if differences DiffDX and DiffDY are both smaller than the corresponding thresholds, a first segment common to both mappings is considered to have been found; and j) the matched minutiae, that is, their respective serial numbers, are stored and a bit (flag) SEGMENT of validation of the existence of a first common segment is positioned.

The difference thresholds define, with the angular threshold, resilience coefficients enabling authorizing a tolerance on modifications of fingerprint collection in orientation and in translation. Preferably, the difference thresholds take the size of the considered segment (for example, the size of the segment of the reference set) into account and are thus relative.

Referring to the example of FIGS. 3A and 3B, the implementation of steps a) to j) hereabove results, to determine the first common segment formed by minutiae mc2, mc3 in the current image and by minutiae mr2 and mr3 in the reference image, in the following step succession: a(mr1), b(mr2), c(mc1, mr1), d(mc1, mr1), c(mc2, mr1), d(mc2, mr1), c(mc3, mr1), d(mc3, mr1), c(mc4, mr1), d(mc4, mr1), e(mc4, mr1), c(mc5, mr1), d(mc5, mr1), e(mc5, mr1), . . . , c(mcn, mr1), d(mcn, mr1), a(mr2), b(mr3), c(mc1, mr2), d(mc1, mr2), e(mc1, mr2), c(mc2, mr2), d(mc2, mr2), e(mc2, mr2), f(mc3, mr3), g(mc3, mr3), h(mc3, mr3), i(mc2, mc3; mr2, mr3), j(mc2, mc3; mr2, mr3).

Figure 6B:
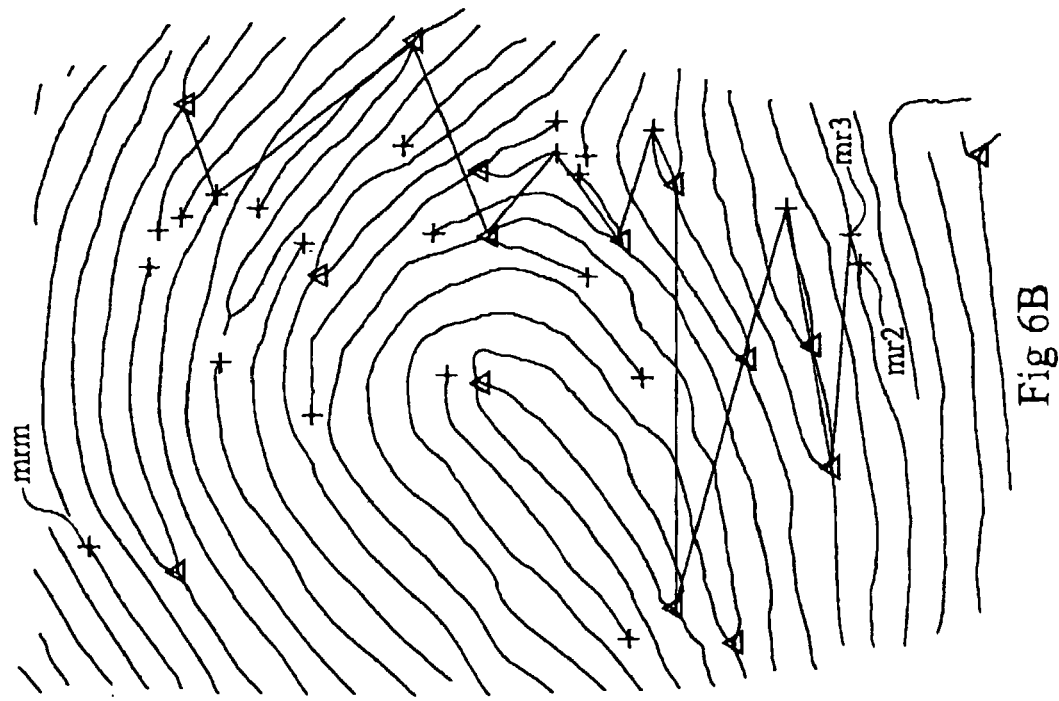
FIGS. 6A and 6B illustrate the implementation of the method of the present invention on the papillary arrangements of FIGS. 3A and 3B.
Figure 6A:
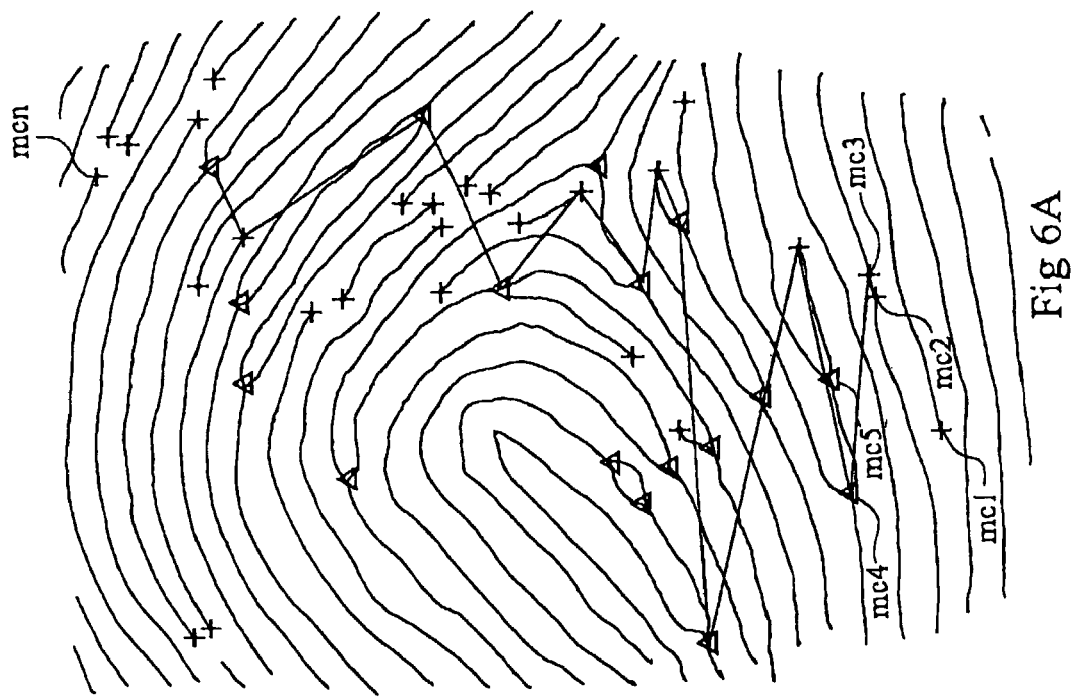

FIGS. 6A and 6B reproduce, with the pattern of the common path of segments between the two fingerprints, the fingerprints of FIGS. 3A and 3B.

Blocks 33 to 36 include the steps of:

k) checking that validation bit SEGMENT is in a state (for example, high) indicative of the existence of a common path—if such is not the case, the comparison loop is ended, otherwise:

l) if the determined segment is the first one of the path, setting to 2 the value of a counter CMIN of matched minutiae in the two images and storing the serial numbers of the matched minutiae of the two sets in two files ExtractC and ExtractR respectively assigned to the current and reference sets, and proceeding to the next step, otherwise checking that the determined segment really follows the preceding segment constitutive of the common path (for example, by checking that the respective serial numbers of the first minutiae of the segments correspond to the respective serial numbers of the last minutiae contained in files ExtractC and ExtractR)—if such is not the case, this means an error in the program execution and the function is abandoned, otherwise:

m) proceeding to the search for a next pair of minutiae, coming out of block 35.

Block 37 includes the steps of:

n) extracting, from the current and reference sets, the information (coordinates, type and angle) of the last minutiae of the paths stored in files ExtractC and ExtractR;

o) selecting, in the reference set, the next free minutia, to form a reference segment—if there is no more free minutia in the reference set, block 37 is left without having determined any new segment;

p) extracting, from the current set, the next minutia to search the second point of the segment of the current image, and comparing the type of this second minutia with that of the second minutia selected at step o)—if there is no next minutia, returning to step o) to change the second reference minutia;

q) if the second minutiae are not of the same type, returning to step p) to select the next minutia of the current image as the second minutia of the searched segment, if the second minutiae are of the same, calculating the angular difference between the second current and reference minutiae;

r) comparing the angular difference with the angular threshold—if the angular difference is greater than the threshold, returning to step p) to select the next minutia, otherwise:

s) calculating distances DRefX and DRefY, DImaX and DImaY and comparing differences DiffDX and DiffDY with respect to the difference thresholds in abscissa and in ordinate—if one of differences DiffDX and DiffDY is greater than the corresponding threshold, returning to step p) to select the next minutia, and if differences DiffDX and DiffDY are both smaller than the corresponding thresholds, considering that a new segment common to the two mappings has been found; and t) storing the matched minutiae and positioning a bit (flag) NEWPAIR of validation of the existence of a new common pair.

Referring to the example of FIGS. 3A and 3B, the implementation of steps n to t hereabove results, to determine the second common segment formed by minutiae mc3, mc4 in the current image and by minutiae mr3 and mr4 in the reference image, in the following step succession: n(mc3, mr3), o(mr4), p(mc4, mr4), q(mc4, mr4), r(mc3, mc4; mr3, mr4), s(mc3, mc4; mr3, mr4), t(mc3, mc4; mr3, mr4).

Blocks 38 to 47 include the steps of:

u) checking that validation bit NEWPAIR indicates the existence of a new pair of common minutiae.

If not (blocks 39, 40, 47):

v) comparing the number of regressions of the current path with the predetermined threshold THR beyond which the recognition is stopped, otherwise:

w) decrementing counter CMIN of matched minutiae in the current path, and incrementing the number of regressions of the current path; and x) checking whether the number of minutiae of counter CMIN is greater than 2, that is, that the regression does not bring back to the origin of the path—if not, the search for a new pair is resumed (step n) after having suppressed the references of the current pair of the path, otherwise, returning to step a) (with the necessary initializations).

If yes (blocks 41, 42, 43, 44, 45):

y) comparing the number of minutiae of the current path with the number of minutiae of the maximum stored path—if the number of current minutiae is greater, incrementing the counter of matched minutiae of the path and resuming the storage operations of step 1) with the found segment; and z) comparing the number of matched minutiae with a threshold THM—if this number is greater than the threshold, providing the result in the form of the number of common minutiae, otherwise, returning to step n) to search for a new pair.

The parameterizing necessary to the implementation of the present invention essentially includes defining thresholds of taking the neighboring minutiae into account, that is, resilience coefficients authorizing a tolerance on fingerprint collection modifications (pressure difference or slight shifts in the finger position). Positive and negative thresholds for exiting (stopping) the authentication process in the authentication result are also defined. More specifically, the method of the present invention enables defining not only a comparison threshold THM beyond which it is sure that the fingerprints are identical, but also at least one comparison threshold THL and/or THR beyond which it is known that no identity will be found between the two fingerprints. The comparison step can then be stopped without having to examine all minutia pairs.

The creating of a reference file is preferentially performed by successively comparing several collections of the same fingerprint to take mean values for the filed coordinates of the different minutiae. The number of prints examined to create the reference image ranges between 2 and 10, and preferably is 3.

According to a preferred embodiment of the present invention, the parameterizing of the minimum threshold of matched minutiae is not a predetermined number but corresponds to a percentage of the number of minutiae of the reference image.

An advantage of the present invention is that the method is particularly fast to determine the identity between two fingerprints. This rapidity is especially provided by the fact that the algorithm can be stopped, be it positively or negatively.

Another advantage of the present invention is that its implementation consumes less program resources and memory resources than conventional methods.

Another advantage of the present invention is that the method is easy to parameterize according to the chosen security level.

Of course, the present invention is likely to have various alterations, modifications, and improvements which will readily occur to those skilled in the art. In particular, the implementation of the algorithm of the present invention by conventional computer means is within the abilities of those skilled in the art based on the functional indications given hereabove and taking the application, the available resources, and the thresholds chosen for the different tests into account.

Further, the forming of a sensor adapted to implementing the present invention is also within the abilities of those skilled in the art based on the functional indications given hereabove. It should however be noted that the present invention is compatible with the forming of a sensor in smart card form.

Finally, the present invention has been described while assuming fingerprint images having identical scales. The present invention however also applies to fingerprints having different scales. Either the two prints may be brought to the same scale before executing the process, or the scale ratio may be taken into account in the distance comparison (the scale ratio does not modify the angles of the minutiae). Adapting the method to enable processing of prints having different scales is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for comparing a set of minutiae of a current image with a set of minutiae of a reference image, including the steps of:
   arranging the minutiae in order of their Cartesian coordinates in an image plane from a predetermined point of origin;
   searching, in the reference set and in the current set, for a common path of similar minutiae; and
   considering that there is an identity between the two images if the common path is comprised of a number of segments greater than a first threshold,
   wherein the step of searching for the common path is performed, segment by segment, by increasing coordinates of the minutiae defining the segments,
   wherein, when the step of searching for a new segment of the common path is unsuccessful, the step of searching is resumed from a preceding segment, taking no account of the minutia having led to an unsuccessful search, and
   wherein the number of times when the step of searching is resumed from a preceding segment is compared with a regression threshold beyond which it is considered that there is no identity between the current and reference images.

2. The method of claim 1, wherein the regression threshold is a function of the numbers of minutiae in the current and reference sets.

3. A method for comparing a set of minutiae of a current image with a set of minutiae of a reference image, including the steps of:
   arranging the minutiae in order of their Cartesian coordinates in an image plane from a predetermined point of origin;
   searching, in the reference set and in the current set, for a common path of similar minutiae;
   considering that there is an identity between the two images if the common path is comprised of a number of segments greater than a first threshold;
   selecting, in each of the current set and in the reference set, a first pair of minutiae starting from the cartesian origin of the respective referentials of the two images to calculate a current segment and a reference segment;
   comparing if the calculated segments are identical in orientation, in length, and in type of involved minutiae; and
   if so, taking this first pair of minutiae as the starting point of a path and if not, proceeding to next pairs of minutiae,
   wherein the step of comparing is achieved by determining if the orientation and length identity between two segments are within a predetermined orientation tolerance and a predetermined length tolerance in the cartesian coordinates, respectively, and
   wherein the orientation tolerance is approximately 10 degrees.

4. A method for comparing a set of minutiae of a current image with a set of minutiae of a reference image, including the steps of:
   arranging the minutiae in order of their Cartesian coordinates in an image plane from a predetermined point of origin;
   searching, in the reference set and in the current set, for a common path of similar minutiae;
   considering that there is an identity between the two images if the common path is comprised of a number of segments greater than a first threshold;
   selecting, in each of the current set and in the reference set, a first pair of minutiae starting from the cartesian origin of the respective referentials of the two images to calculate a current segment and a reference segment;
   comparing if the calculated segments are identical in orientation, in length, and in type of involved minutiae; and if so, taking this first pair of minutiae as the starting point of a path and if not, proceeding to next pairs of minutiae, wherein the step of comparing is achieved by determining if the orientation and length identity between two segments are within a predetermined orientation tolerance and a predetermined length tolerance in the cartesian coordinates, respectively, and wherein the translation tolerance is approximately one third of the image size in a direction corresponding to a finger length, and at most more or less approximately one quarter of the image size in the direction corresponding to the finger width.

5. A method of comparing fingerprints, comprising the steps of:

arranging minutiae of a current image of a fingerprint in order of their coordinates from a current image origin;

arranging minutiae of a reference image of a fingerprint in order of their coordinates from a reference image origin;

searching for a common path of minutiae present in both the set of minutiae of the current image and the set of minutiae of the reference image, the path being comprised of a plurality of segments between minutia; and determining that the current image and the reference image are a match upon determining that the path is comprised of a number of segments greater than a first threshold, wherein the step of searching for the path of minutiae is performed by searching the set of minutiae of a current image minutia by minutia in order from the current image origin;

wherein, when a selected minutia is determined not to be in the common path, the step of searching is resumed from a preceding minutia, taking no account of the minutia having led to an unsuccessful search; and wherein the number of times when the search is resumed from a preceding segment is compared with a regression threshold such that when the regression threshold is exceeded it is considered that there is no match between the current image and the reference image.

6. The method of claim 5, further comprising a step of selecting the regression threshold based on the number of minutiae in at least one of the set of minutiae of the current image and the set of minutiae of the reference image.

7. A method of comparing fingerprints, comprising the steps of:

arranging minutiae of a current image of a fingerprint in order of their coordinates from a current image origin;

arranging minutiae of a reference image of a fingerprint in order of their coordinates from a reference image origin; and searching for a common path of minutiae present in both the set of minutiae of the current image and the set of minutiae of the reference image, the path being comprised of a plurality of segments between minutia, wherein the step of searching for a path present in both the current set and in the reference set includes selecting a first minutia in the current set and a first minutia in the reference set; and determining whether the first minutia in the current set and the first minutia in the reference set have the same orientation and length relative the current image origin and the reference image origin, respectively;

wherein the step of searching for a path present in both the current set and in the reference set further includes selecting a second minutia in the current set to form a first current segment and a second minutia in the reference set to form a first current segment; and determining whether the first reference segment, and the first current segment have the same orientation and length;

wherein the orientation and length of the first current segment are compared to the orientation and length of the first reference segment, respectively, and the first current segment and the first reference segment are determined to match if a difference between the orientation of the first reference segment and the orientation of the first reference segment is within an orientation threshold, and a difference between the length of the first reference segment and the length of the first reference segment is within a length threshold; and wherein the orientation threshold is approximately 10 degrees.

8. An apparatus for comparing fingerprints, comprising:

a means for arranging minutiae of a current image of a fingerprint in order of their coordinates from a current image origin;

a means for arranging minutiae of a reference image of a fingerprint in order of their coordinates from a reference image origin;

a means for searching for a common path of minutiae present in both the set of minutiae of the current image and the set of minutiae of the reference image, the path being comprised of a plurality of segments between minutia; and a means for determining that the current image and the reference image are a match upon determining that the path is comprised of a number of segments greater than a first threshold, wherein the means for searching for a common path searches the set of minutiae of a current image minutia by minutia in order from the current image origin;

wherein the means for searching for a common path of minutiae is configured such that when a selected minutia is determined not to be in the common path, searching is resumed from a preceding minutia, taking no account of the minutia having led to an unsuccessful search; and wherein the number of times the means for searching for a common path of minutiae resumes searching from a preceding segment is compared with a regression threshold such that when the regression threshold is exceeded it is considered that there is no match between the current image and the reference image.

9. The method of claim 8, further comprising a means for selecting the regression threshold based on the number of minutiae in at least one of the set of minutiae of the current image and the set of minutiae of the reference image.

* * * * *